US011884360B2

(12) United States Patent
Suzuki et al.

(10) Patent No.: US 11,884,360 B2
(45) Date of Patent: Jan. 30, 2024

(54) ELECTRICAL COMPONENT MOUNTING STRUCTURE FOR SADDLED VEHICLE

(71) Applicant: HONDA MOTOR CO., LTD., Tokyo (JP)

(72) Inventors: Shota Suzuki, Wako (JP); Haruka Tsuda, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 997 days.

(21) Appl. No.: 16/812,994

(22) Filed: Mar. 9, 2020

(65) Prior Publication Data

US 2020/0290702 A1    Sep. 17, 2020

(30) Foreign Application Priority Data

Mar. 12, 2019    (JP) ................................. 2019-045176

(51) Int. Cl.
*B62L 3/00*    (2006.01)
*B62J 45/20*    (2020.01)
*B62J 45/42*    (2020.01)

(52) U.S. Cl.
CPC ................. *B62L 3/00* (2013.01); *B62J 45/20* (2020.02); *B62J 45/42* (2020.02)

(58) Field of Classification Search
CPC ............... B62L 3/00; B62J 45/20; B62J 45/42
See application file for complete search history.

(56) References Cited

U.S. PATENT DOCUMENTS 6,318,743 B1 * 11/2001 Nakashima ............ B62K 11/04
                                                            180/219
10,046,823 B2 *  8/2018 Azuma .................. B60T 8/1706
10,112,673 B2   10/2018 Kitagawa et al.
(Continued)

FOREIGN PATENT DOCUMENTS

DE    10 2016 010 447 A1    3/2017
JP       2001-071961 A      3/2001
(Continued)

OTHER PUBLICATIONS

Office Action, dated Mar. 30, 2021, issued over the corresponding German Patent Application No. 10 2020 106 588.4.
(Continued)

*Primary Examiner* — Kevin Hurley
*Assistant Examiner* — Hosam Shabara
(74) *Attorney, Agent, or Firm* — Carrier, Shende & Associates, P.C.; Joseph P. Carrier; Jeffrey T. Gedeon

(57) ABSTRACT

Provided is an electrical component mounting structure for saddled vehicle capable of concentrating a plurality of electrical components close to the center of the vehicle body while protecting the electrical components. An electrical component mounting structure places the control device to control the vehicle at a position surrounded with a vehicle body frame supporting a power unit of the saddled vehicle, a rear wheel that rotates by a driving force from the power unit, a seat for a rider. The electrical component mounting structure includes the case member including a lower case storing a drive unit, and an upper case covering the lower case from the above. The case member has a sensor storage part storing a sensor at a front end. The control device is attached to the upper case.

14 Claims, 14 Drawing Sheets

(56) References Cited

U.S. PATENT DOCUMENTS

2015/0291046 A1* 10/2015 Kawabata .................. B62J 1/08
                                                        180/220
2015/0329168 A1* 11/2015 Kawabata ................ B62M 6/90
                                                        318/139
2015/0329174 A1* 11/2015 Inoue ....................... B62M 6/80
                                                        429/71

FOREIGN PATENT DOCUMENTS

| JP | 2006-240460 A | 9/2006 |
| JP | 2017-047711 A | 3/2017 |
| WO | 2019/064479 A1 | 4/2019 |
| WO | 2019/064951 A1 | 4/2019 |

OTHER PUBLICATIONS

Office Action dated Jan. 27, 2021 issued in the corresponding Japanese Patent Application 2019-045176.

* cited by examiner

ELECTRICAL COMPONENT MOUNTING STRUCTURE FOR SADDLED VEHICLE

BACKGROUND

1. Technical Field

The present invention relates to electrical component mounting structures for saddled vehicle, and more particularly relates to an electrical component mounting structure for saddled vehicle capable of concentrating a plurality of electrical components at a position close to the center of the vehicle body.

2. Description of the Background

Conventionally electrical component mounting structures for saddled vehicle have been known, which concentrate a plurality of electrical components at a position close to the center of the vehicle body.

Patent Literature 1 discloses an electrical component mounting structure for a motorcycle having a pair of left and right seat frames. This structure includes a single stay fixed to the seat frames, and fixes an ABS modulator and an inertial sensor to this single stay so as to place the ABS modulator and the inertial sensor side by side between the left and right seat frames.

CITATION LIST

Patent Literature

Patent Literature 1: Japanese Patent Application Publication No. 2017-47711

BRIEF SUMMARY

Many parts of the surface of these ABS modulator and inertial sensor are exposed to the outside in the structure of Patent Literature 1, and so this structure still has room for improvement in the effect of protecting the electrical components from external factors, such as water, flying stones, and access by third party, or for the concentration of more electrical components.

The present invention solves the problem of the conventional techniques, and provides an electrical component mounting structure for saddled vehicle capable of concentrating a plurality of electrical components at a position close to the center of the vehicle body while enhancing the protective effect for the electrical components.

To fulfill the above, the first aspect of the embodiments provides an electrical component mounting structure for a saddled vehicle (1) including a vehicle body frame (F) supporting a power unit (P) of the saddled vehicle (1), a rear wheel (WR) that rotates by a driving force from the power unit (P), a seat (33), on which a rider sits, and a control device (92, 94) configured to control the vehicle, the electrical component mounting structure being configured to place the control device (92, 94) at a position surrounded with the vehicle body frame (F), the rear wheel (WR), and the seat (33), the electrical component mounting structure including:
 a case member (60) to place the control device (92, 94), the case member (60) including
  a lower case (80) storing a drive unit (50), and
  an upper case (70) joining to the lower case (80) and covering the lower case (80) from the above, the case member (60) having a sensor storage part (71) at a front end, the sensor storage part (71) storing a sensor (90); and
 the control device (92, 94) attached to the upper case (70).

The second aspect of the embodiments provides that the sensor storage part (71) includes a container (71b) storing the sensor (90) and a lid (71a) that covers the container (71b) from the above,
 the lid (71a) is located at a front end of the upper case (70), and
 the container (71b) is located at a front end of the lower case (80).

The third aspect of the embodiments provides that a rear cushion (34) is disposed forward and downward of the sensor storage part (71), and
 the rear cushion (34) absorbs vibrations of a swing arm (24) that rotatably supports the rear wheel (WR).

The fourth aspect of the embodiments provides that a fuel tank (2) is disposed above the sensor storage part (71).

The fifth aspect of the embodiment provides that attachment of the upper case (70) and the lower case (80) define a side opening (58) between the upper case (70) and the lower case (80).

The sixth aspect of the embodiments provides that the control device (92, 94) includes
 a first control device (92) stored in a storage recess (70a) of the upper case (70), and
 a second control device (94) that is positioned above and adjacent to the first control device (92).

The seventh aspect of the embodiments provides that the upper case (70) is integral with a first lock plate (74) and a second lock plate (73) that are positioned at a rear end of the upper case (70), the first lock plate (74) and the second lock plate (73) being turnable around the rear end of the upper case (70),
 the first lock plate (74) turns forward to press an upper face of the first control device (92) stored in the storage recess (70a),
 the second control device (94) is positioned above and adjacent to the first control device (92) having the first lock plate (74) between the first and second control devices (92, 94),
 the second lock plate (73) turns forward to press an upper face of the second control device (94), and
 the first lock plate (74) and the second lock plate (73) have forward ends that engage with an upper face of the upper case (70).

The eighth aspect of the embodiments provides that the case member (60) has a bottom face, and a regulator (53) is attached to the bottom face.

The ninth aspect of the embodiments provides that the case member (60) has, at its rear end, a cylindrical recess (70b) to position a cylindrical canister (51) in proximity to the case member (60).

The tenth aspect of the embodiments provides that a rear fender (42) is attached to a lower part of the rear end of the case member (60), and the rear fender (42) covers the rear wheel (WR) from the front and the above.

According to the first aspect, the electrical component mounting structure for a saddled vehicle (1) including a vehicle body frame (F) supporting a power unit (P) of the saddled vehicle (1), a rear wheel (WR) that rotates by a driving force from the power unit (P), a seat (33), on which a rider sits, and a control device (92, 94) configured to control the vehicle, the electrical component mounting structure being configured to place the control device (92, 94) at a position surrounded with the vehicle body frame (F), the rear wheel (WR), and the seat (33), the electrical component mounting structure including: a case member (60) to place the control device (92, 94), the case member (60) including a lower case (80) storing a drive unit (50), and an upper case (70) joining to the lower case (80) and covering the lower case (80) from the above, the case member (60) having a sensor storage part (71) at a front end, the sensor storage part (71) storing a sensor (90); and the control device (92, 94) attached to the upper case (70). With this configuration, the sensor and the control devices are placed in the case member storing the drive unit. This concentrates a plurality of electrical components and so concentrates their mass. This also eliminates a dedicated stay for attachment of the sensor and the control devices to the vehicle body, and so reduces the number of components. The sensor storage part at the front end of the case member protects the sensor from heat generated at the power unit, flying stones and the like, and also places the sensor at a position close to the vehicle-body center suitable for the measurement of the acceleration of the vehicle body.

According to the second aspect, the sensor storage part (71) includes a container (71b) storing the sensor (90) and a lid (71a) that covers the container (71b) from the above, the lid (71a) is located at a front end of the upper case (70), and the container (71b) is located at a front end of the lower case (80). With this configuration, attaching the upper case to the upper part of the lower case closes the upper part of the container with the lid. This configuration protects the sensor from water, dust and the like with the lid of the container and without additional components, and also facilitates the assembly job of the case member.

According to the third aspect, a rear cushion (34) is disposed forward and downward of the sensor storage part (71), and the rear cushion (34) absorbs vibrations of a swing arm (24) that rotatably supports the rear wheel (WR). The rear cushion positioned forward and downward of the sensor storage unit protects the sensor storage unit from water, stones and the like flying from the forward and downward during travelling.

According to the fourth aspect, a fuel tank (2) is disposed above the sensor storage part (71). Such a fuel tank protects the sensor storage unit from water, stones and the like flying from upward of the vehicle body.

According to the fifth aspect, attachment of the upper case (70) and the lower case (80) define a side opening (58) between the upper case (70) and the lower case (80). Through such a side opening defined between the upper case and the lower case, tubular members, such as hydraulic piping and power harnesses, connecting to the drive unit including the ABS modulator are easily guided. This side opening also dissipates heat generated at the drive unit.

According to the sixth aspect, the control device (92, 94) includes a first control device (92) stored in a storage recess (70a) of the upper case (70), and a second control device (94) that is positioned above and adjacent to the first control device (92). Vertically overlapping of the two control devices reduces the height of the case member.

According to the seventh aspect, the upper case (70) is integral with a first lock plate (74) and a second lock plate (73) that are positioned at a rear end of the upper case (70), the first lock plate (74) and the second lock plate (73) being turnable around the rear end of the upper case (70), the first lock plate (74) turns forward to press an upper face of the first control device (92) stored in the storage recess (70a), the second control device (94) is positioned above and adjacent to the first control device (92) having the first lock plate (74) between the first and second control devices (92, 94), the second lock plate (73) turns forward to press an upper face of the second control device (94), and the first lock plate (74) and the second lock plate (73) have forward ends that engage with an upper face of the upper case (70). These first lock plate and second lock plate stably hold the first control device and the second control device. The first lock plate sandwiched between the first control device and the second control device keeps the minimum distance between these control devices while isolating the control devices from vibrations and enabling the heat dissipation. These first lock plate and second lock plate are integral with the upper case, and this reduces the number of components of the upper case.

According to the eighth aspect, the case member (60) has a bottom face, and a regulator (53) is attached to the bottom face. This configuration places the regulator at a position with good heat-dissipation efficiency, and eliminates a dedicated stay for the regulator and so reduces the number of components.

According to the ninth aspect, the case member (60) has, at its rear end, a cylindrical recess (70b) to position a cylindrical canister (51) in proximity to the case member (60). This reduces the gap between the case member and the canister, and so reduces a redundant space.

According to the tenth aspect, a rear fender (42) is attached to a lower part of the rear end of the case member (60), and the rear fender (42) covers the rear wheel (WR) from the front and the above. This eliminates a dedicated stay for attachment of the rear fender to the vehicle body and so reduces the number of components.

DETAILED DESCRIPTION

The following describes a preferred embodiment of the present invention in details with reference to the drawings.

Figure 1:
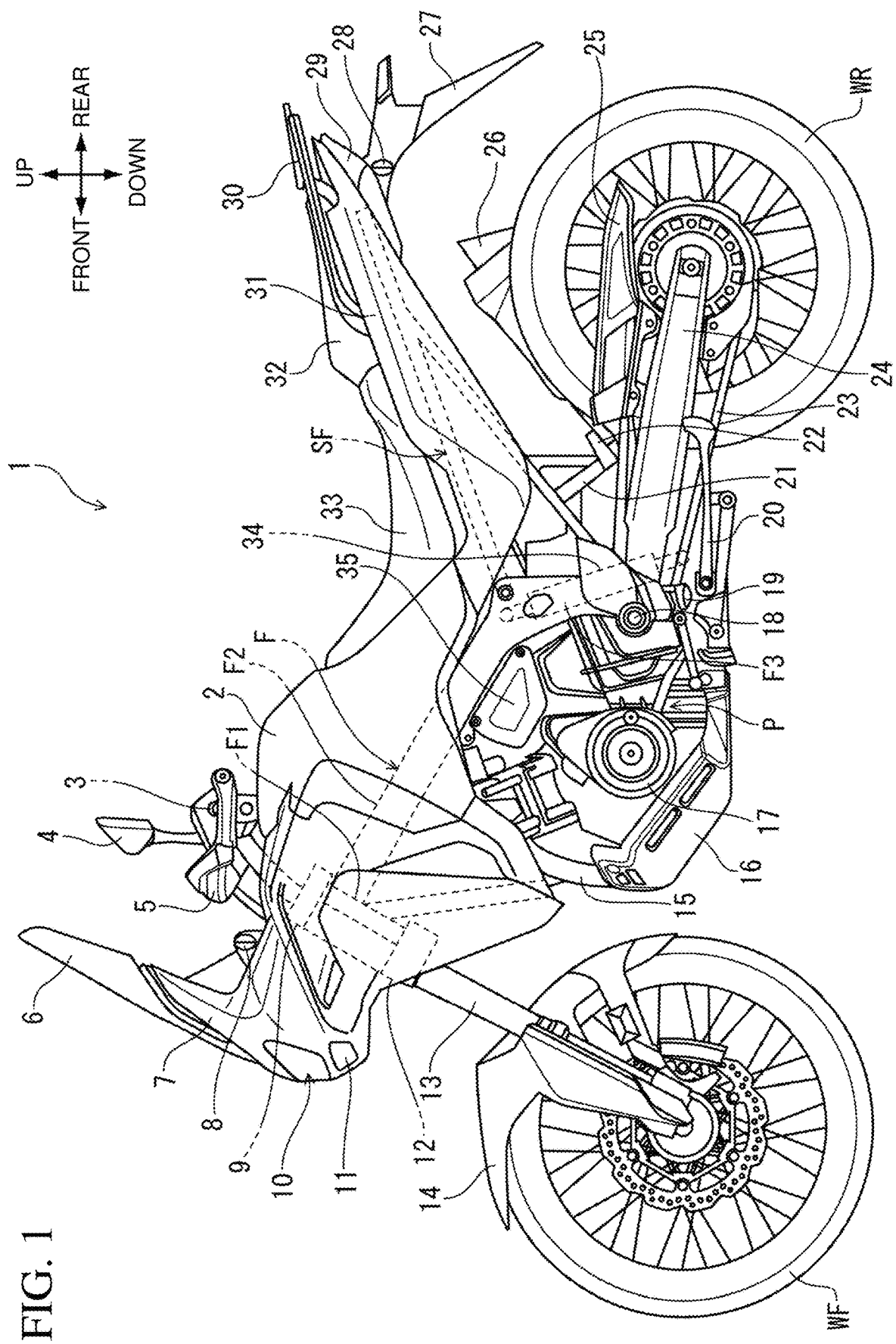
FIG. 1 is a left side view of a motorcycle including an electrical component mounting structure according to one embodiment of the present invention.

FIG. 1 is a left side view of a motorcycle 1 including an electrical component mounting structure according to one embodiment of the present invention. The motorcycle 1 is a dual-purpose type saddled vehicle configured to transmit the driving force for travelling from a power unit P having an integral structure of a four-stroke engine and a transmission to a rear wheel WR via a drive chain 23. The vehicle body frame F of the motorcycle 1 includes a pair of left and right main frames F2, and a head pipe F1 at the front end of the main frames F2. The head pipe F1 pivotably supports a not-illustrated a steering stem. A pair of left and right front forks 13 supports a front wheel WF rotatably, and a top bridge 9 and a bottom bridge 12 fixed to the steering stem at an upper part and a lower part of the head pipe F1 support the front forks 13. The motorcycle includes a steering handle 3 fixed at the top bridge 9, and a pair of left and right rear view mirrors 4 and a knuckle guard 5 are attached to the steering handle 3.

The steering handle 3 is covered with a front cowl 7 at the front, and the front cowl 7 supports a head light 10 and a screen 6. The motorcycle 1 has a pair of left and right front winker units 8 between the front cowl 7 and the steering handle 3. A corning light 11 is disposed below the head light 10, and turns on during cornering of the motorcycle 1 so as to illuminate the turning direction depending on the lean angle. A front fender 14 is fixed to the front forks 13 to cover the upper part of the front wheel WF.

A power unit P is disposed under the main frame F2, and an undercover 16 is disposed under the power unit P to protect the front part and the lower part of a crankcase 17 and an exhaust pipe 15. Combustion gas at the power unit P flows through the exhaust pipe 15 and is emitted from a muffler 26 on the right in the vehicle width direction.

The main frames F2 join to a pair of left and right pivot frames F3 at the lower rear end, and each of the pivot frames F3 extends downward and supports a pivot 18 of a swing arm 24 that rotatably supports the rear wheel WR. The pivot 18 swingably supports the front end of the swing arm 24. The swing arm 24 is positioned rearward of the pivot 18 and suspends from the pivot frames F3 via a rear cushion 34 that absorbs vibrations of the swing arm 24. A pair of left and right footrest steps 19 is attached to a lower end of the pivot frames F3. A side stand 20 is pivotably supported rearward of the left footrest step 19 on the left in the vehicle width direction. A chain cover 25 is attached above the swing arm 24, and the chain cover 25 covers the upper part of the drive chain 23. A cover 35 of an electrical-component box 36 to store electrical components, such as an in-vehicle battery, is disposed forward of the pivot frames F3 and between the main frames F2 and the power unit P.

A fuel tank 2 is disposed above the main frames F2, and the rear part of the main frames F2 join to a seat frame SF. The seat frame SF extends rearward and upward along the vehicle body. A pair of left and right pillion step holders 21 is attached to a lower part of the seat frame SF, and the pillion step holders 21 support pillion steps 22.

The seat frame SF supports a front seat 33 and a rear seat 32 rearward of the fuel tank 2. A rear cowl 31 covers the seat frame SF from the outside in the vehicle width direction, and the seat frame SF supports a rear carrier 30 on the outside of the rear seat 32 in the vehicle width direction. A tail light unit 29 and a rear fender 27 are disposed rearward of the rear cowl 31, and a pair of left and right rear winker units 28 is disposed at the base of the rear fender 27.

Figure 2:
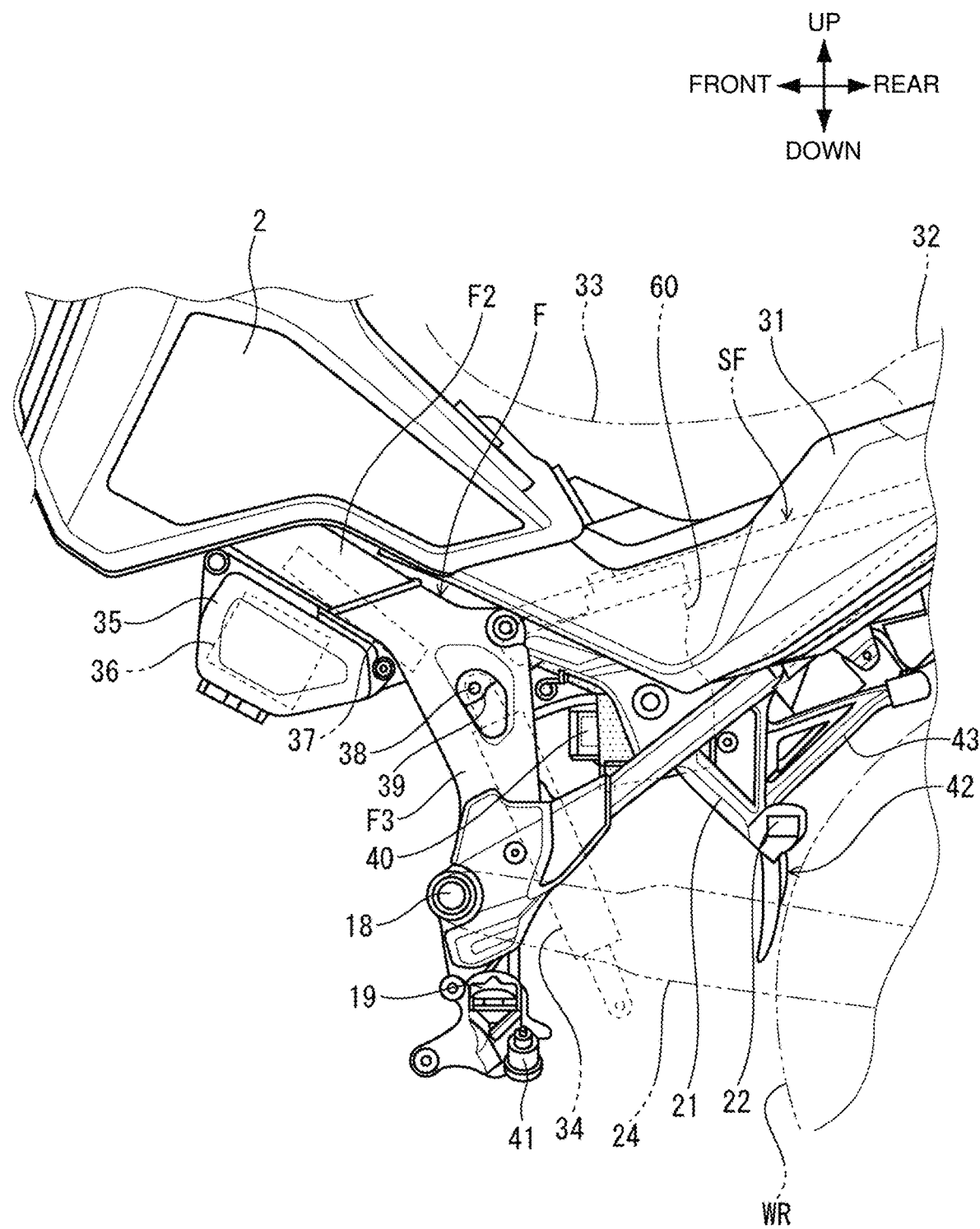
FIG. 2 is a partially enlarged left side view of FIG. 1.

FIG. 2 is a partially enlarged left side view of FIG. 1. This drawing shows the motorcycle 1 shown in FIG. 1 without some components, such as the power unit P and the swing arm 24. An electrical component mounting structure of the present invention mainly includes a case member 60 to displace a plurality of electrical components. The case member 60 is disposed in a space defined with the fuel tank 2 having the rear end extending rearward and downward of the vehicle body, the seat 33 located rearward of the fuel tank 2, the rear cushion 34 inclined forward relative to the vertical direction, and the circumference of the rear wheel WR in the side view of the vehicle body. The case member 60 is located substantially at the center in the vehicle width direction and fits in a space rearward and upward of the pivot frames F3 and between the pair of left and right seat frames SF.

The cover 35, which is on the left in the vehicle width direction and below the main frames F2, covers the electrical-component box 36 to store the in-vehicle battery and the like from the left in the vehicle width direction. A plate-like ECU 37 having a thickness is disposed above the cover 35 and inside of the main frames F2. In this way the dead space is utilized to dispose the ECU 37, and the electrical-component box 36 below the ECU 37 protects the ECU 37 from heat generated at the power unit P.

A mount member 39 is fixed between the pair of left and right pivot frames F3. The mount member 39 has a through hole 38 that supports the upper end of the rear cushion 34. A support shaft 41 for the footrest steps 19 and the side stand 20 is attached to the lower end of the pivot frame F3. The lower part of the fuel tank 2 has the rear end extending above the case member 60, and the rear cowl 31 covers most of the lateral part of the case member 60.

A grip member 43 is disposed rearward of the pillion step holder 21 supporting the pillion step 22. The grip member 43 supports the vehicle body when the centerstand is extended. A reservoir tank 40 is disposed forward of the case member 60. The reservoir tank 40 stores brake fluid to be added in a master cylinder of the rear brake. A rear fender 42 is disposed forward of the rear wheel WR to block mud, for example, that is whirled up by the rear wheel WR.

Figure 3:
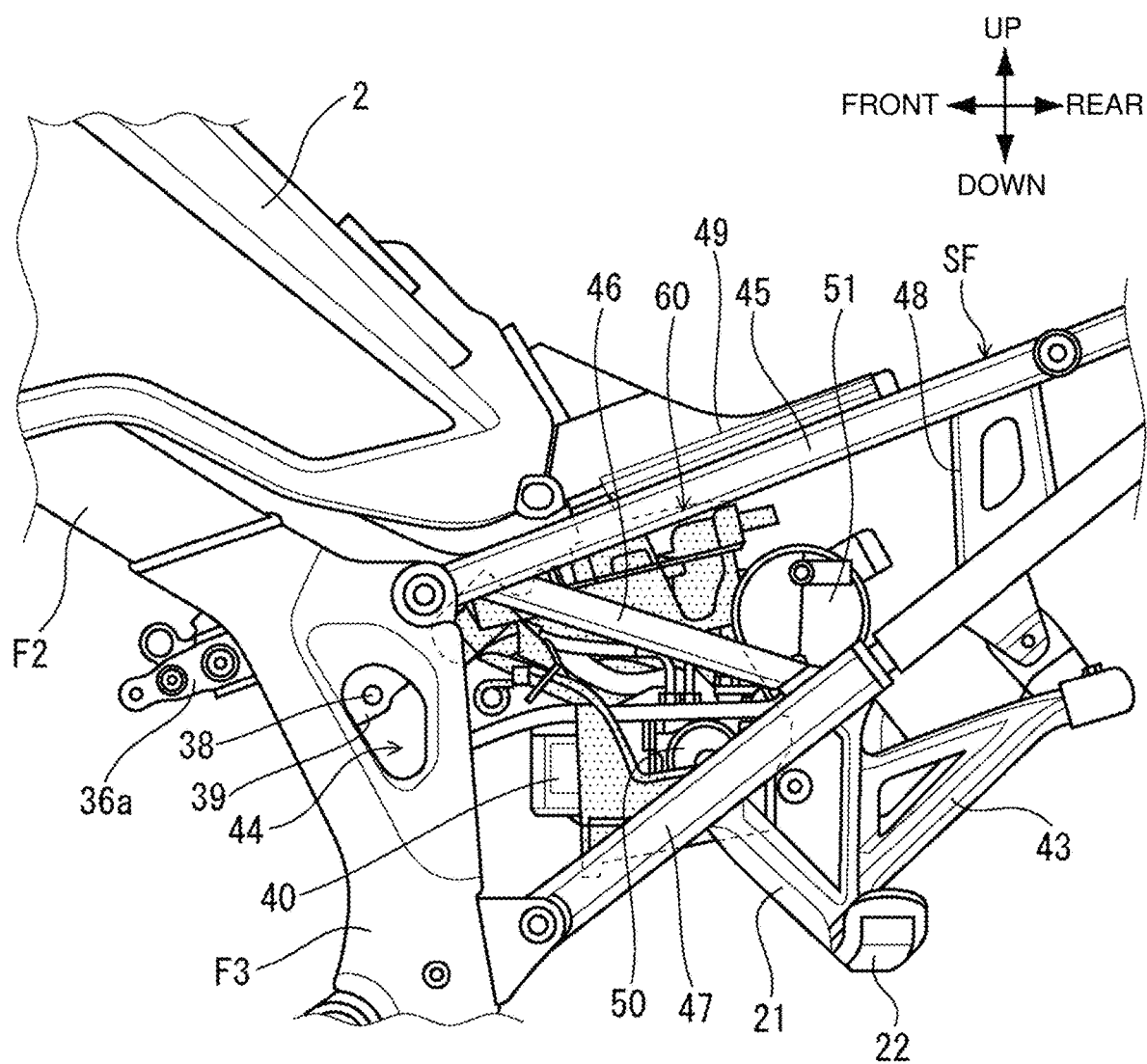
FIG. 3 is a left side view of FIG. 2 without the rear cowl.

FIG. 3 is a left side view of FIG. 2 without the rear cowl 31. The case member 60 stores an ABS modulator 50 at a lower part, and this ABS modulator 50 operates as a drive unit to control the brake-fluid pressure. A cylindrical canister 51 is positioned in proximity to and rearward of the case member 60. In one example, the canister 51 may be a charcoal canister to adsorb vaporized fuel generated inside of the fuel tank 2.

A stay 36a supporting the electrical-component box 36 is disposed forward of the pivot frame F3. The mount member 39, which supports the upper end of the rear cushion 34, is at a visible position through an opening 44 of the pivot frame F3. Each of the seat frames SF on the left and right of the case member 60 in the vehicle width direction includes an upper pipe 45 and a lower pipe 47 connected with a cross pipe 46 and a reinforcing plate 48, and the front ends of the upper pipe 45 and the lower pipe 47 are fixed to the rear part of the pivot frame F3. A plate-like cross member 49 extends between the upper faces of the left and right upper pipes 45 to support the fuel tank 2 and the seat 33.

With this configuration, the upper part of the case member 60 (dot hatching part) is protected by the fuel tank 2 and the cross member 49, the lateral parts of the case member 60 are protected by the seat frames SF, the front part of the case member 60 is protected by the rear cushion 34 and the pivot frames F3, and the rear part of the case member 60 is protected by the rear fender 42. In this way, this configuration protects the surrounding of the case member 60 from flying stones during travelling, accesses by third party and the like.

Figure 4:
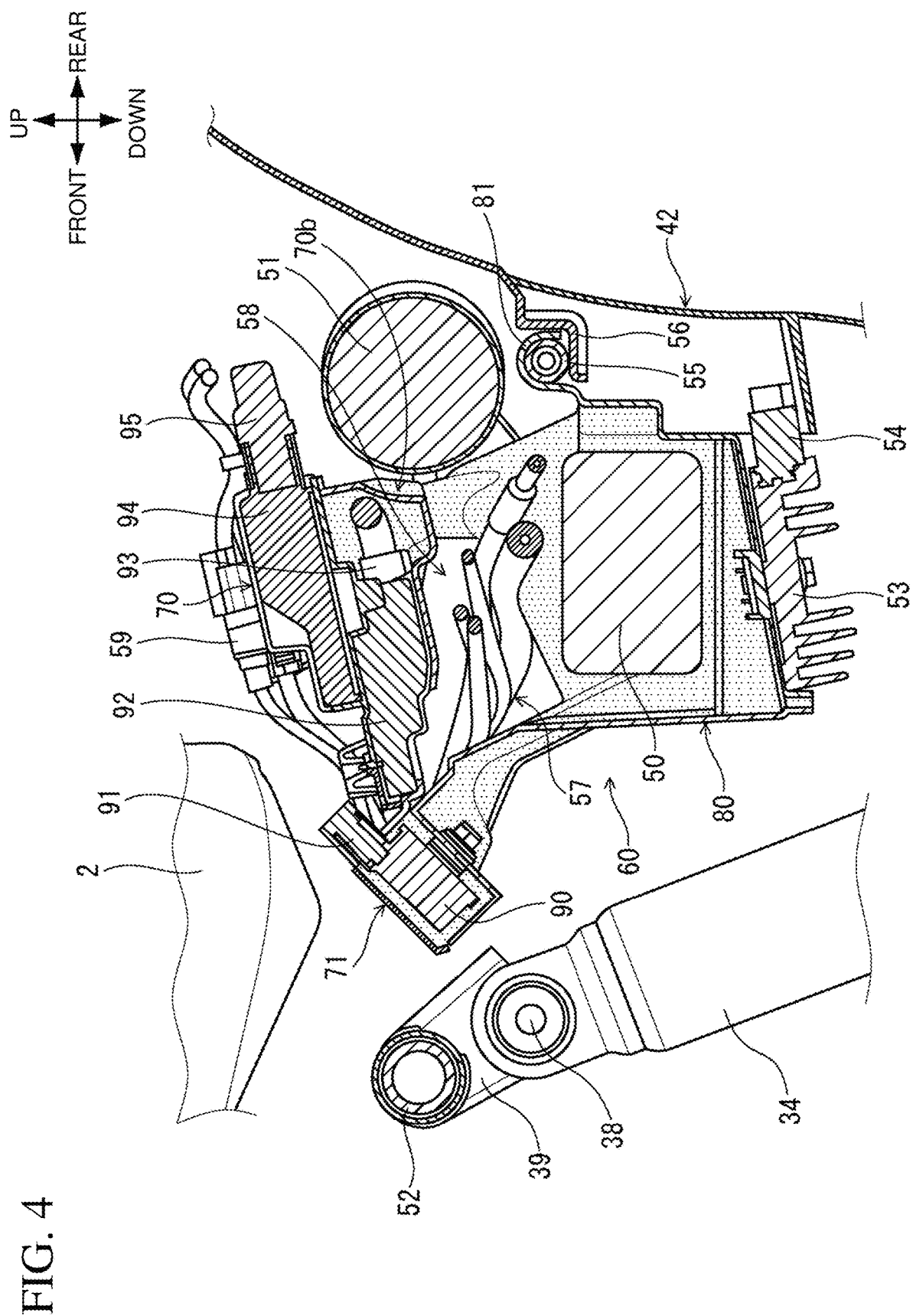
FIG. 4 is a cross-sectional view of the configuration of the case member and the peripherals.

FIG. 4 is a cross-sectional view of the configuration of the case member 60 and the peripherals. The case member 60 is made of a hard resin, for example, and includes an lower case 80 storing the ABS modulator 50 and an upper case 70 attached above the lower case 80. The lower case 80 has a bottom face, to which a regulator 53 having a connector 54 attached to the rear end is attached. This configuration enables effective cooling of the regulator 53 that is a device generating heat. The lower case 80 has a wide curved plate 81 at the rear end, and this curved plate 81 has a shape engaging with an engagement pipe 55 at the rear fender 42 from the above. A supporting plate 56 extends from the rear fender 42, and this supporting plate 56 supports the engagement pipe 55 from the below.

The electrical component mounting structure of the present invention includes the case member 60 having the lower case 80 storing the ABS modulator 50 and the upper case 70 joining to the lower case 80 and covering the lower case 80 from the above. This case member 60 has a sensor storage part 71 to store a gyroscope sensor 90 at the front end, and a first control device 92 and a second control device 94 are attached to the upper case 70. In this way, the gyroscope sensor 90 and the two control devices are placed in the case member 60 storing the ABS modulator 50. This enables concentration of a plurality of electrical components and so mass concentration, and eliminates a dedicated stay for attachment of the gyroscope sensor 90 and the control devices to the vehicle body and so reduces the number of components. The sensor storage part 71 located at the front end of the case member 60 protects the gyroscope sensor 90 from heat generated at the power unit P, the flying stones and the like, and places the gyroscope sensor 90 at a position close to the vehicle-body center that is suitable for the measurement of the angular velocity of the vehicle body.

The case member 60 has the box-like sensor storage part 71 at the front end of the upper part to store the gyroscope sensor 90 with a connector 91. The rear end of the fuel tank 2 extends rearward beyond this sensor storage part 71.

The mount member 39, which supports the upper end of the rear cushion 34, is fixed to a cross pipe 52 joining the left and right pivot frames F3 in the vehicle width direction. The sensor storage part 71 is placed close to the mount member 39 and the upper end of the rear cushion 34. In this way the sensor storage part 71 is placed close to the center of the vehicle body, and this allows the gyroscope sensor 90 to be placed at a position suitable for the measurement of the angular velocity generated at the vehicle body.

The upper case 70 is located rearward of the sensor storage part 71, and the first control device 92 as a DCU (drive control unit) and the second control device 94 as a BMU (battery management unit) are stacked in vertically two-tiered manner in the upper case 70. Specifically the second control device 94 having a connector 95 is positioned above and in proximity to the first control device 92 having a connector 93 and close to the rear end of the first control device 92. A connector 59 of another electrical component is then placed above the second control device 94.

The upper case 70 and the lower case 80 define a side opening 58 therebetween, through which tubular members 57, such as a brake duct and a harness, connecting to the ABS modulator 50 pass. The upper case 70 has a cylindrical recess 70b at the rear end to position the cylindrical charcoal canister 51 in proximity to the upper case 70.

Figure 5:
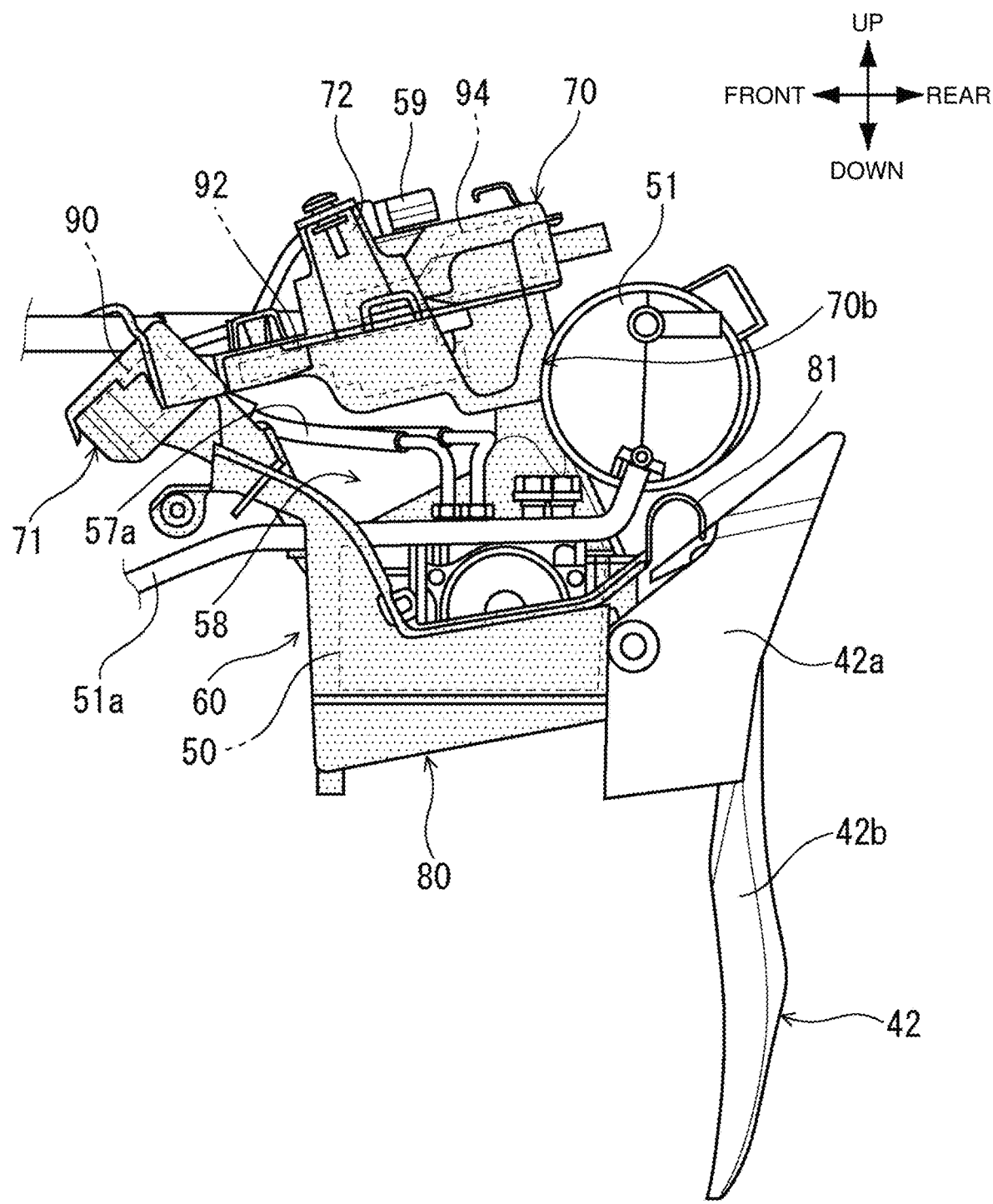
FIG. 5 is a left side view of the case member with a rear fender attached thereto.
Figure 6:
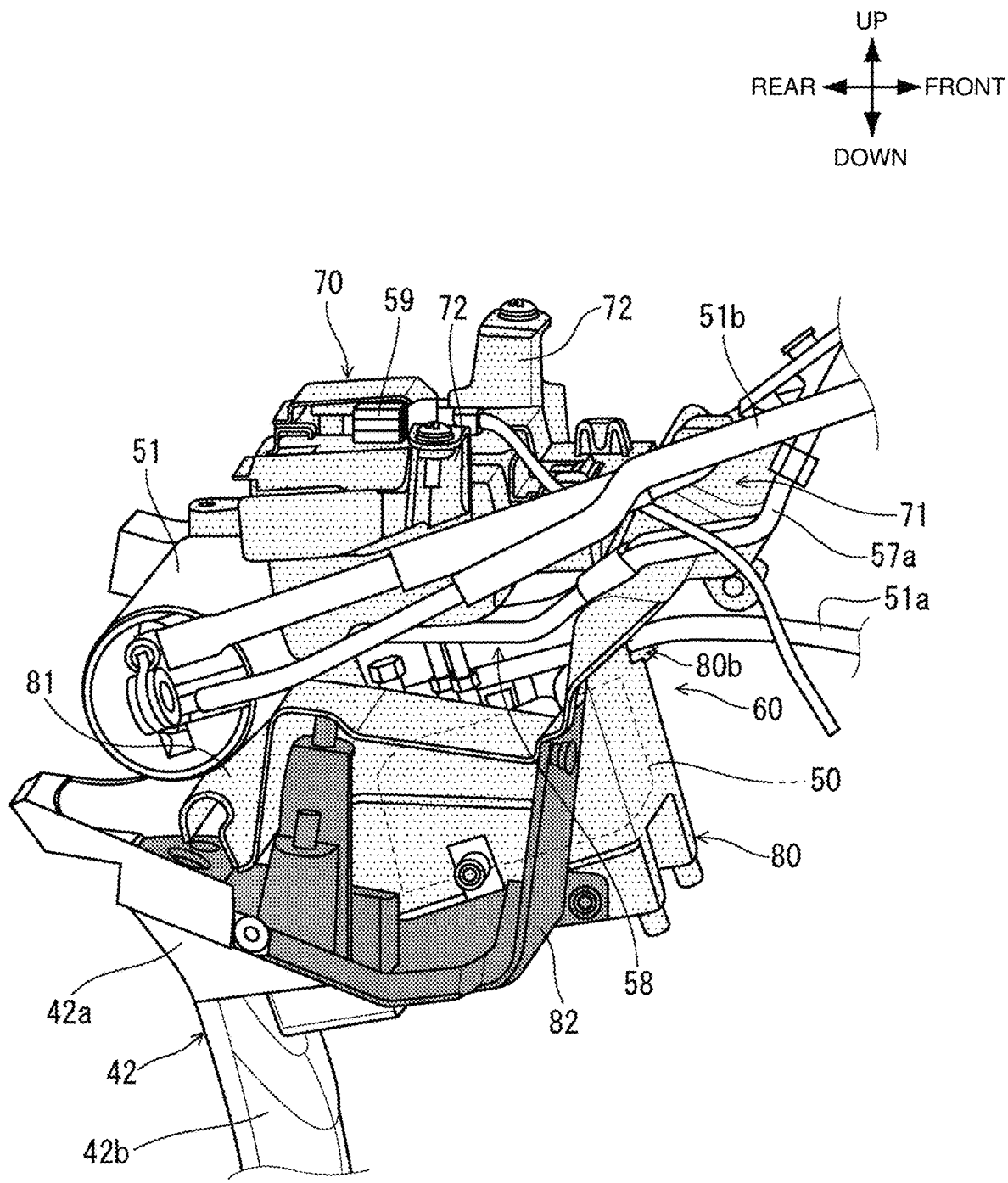
FIG. 6 is a perspective view of the case member viewed from the right front and above.

FIG. 5 is a left side view of the case member 60 with the rear fender 42 attached thereto. FIG. 6 is a perspective view of the case member 60 viewed from the right front and above, and FIG. 7 is a front view of the case member 60.

As described above, the case member 60 includes the lower case 80 storing the ABS modulator 50 and the upper case 70 attached above the lower case 80, the upper case 70 storing the first control device 92 and the second control device 94. FIG. 5 to FIG. 7 show the brake duct 57a passing through the side opening 58 defined between the upper case 70 and the lower case 80. A vent hose 51a connects to a lower end of the charcoal canister 51 on the left, and a guide hole 80b of the lower case 80 guides this vent hose 51a along a route leading to the front lower part of the vehicle body. The rear fender 42 made of a hard resin, for example, includes a box part 42a fixed to the lower case 80 and a plate-like mudguard 42b extending downward from the rear end of the box part 42a.

Referring to FIG. 6, the rear fender 42 is fixed to the lower case 80 via a fixing member 82 (the gray part in the drawing). A vaporized-fuel pipe 51b connecting to the fuel tank 2 is attached to the right side of the charcoal canister 51, and this vaporized-fuel pipe 51b is routed toward the front of the vehicle body along the right side of the upper case 70. The upper case 70 has a pair of left and right stay members 72 that is fixed to the upper faces of the upper pipes 45 (see FIG. 3) of the seat frames SF, and these stay members 72 are to hang the case member 60.

Figure 7:
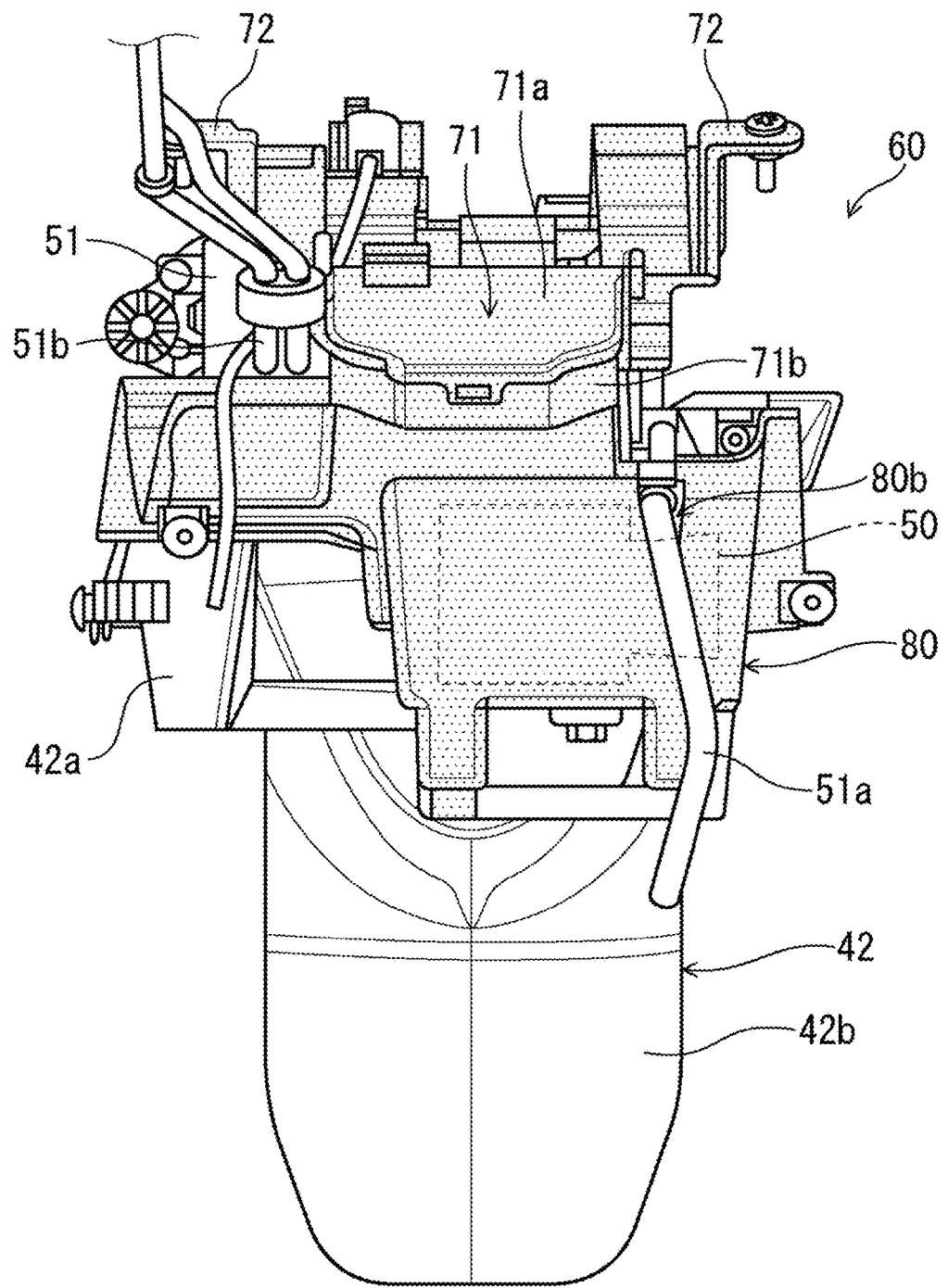
FIG. 7 is a front view of the case member.

Referring to FIG. 7, a part of the lower case 80 that stores the ABS modulator 50 is placed on the left of the vehicle body. The sensor storage part 71 at the front end of the case member 60 includes a container 71b to store the gyroscope sensor 90 and a lid 71a that covers the container 71b from the above. The container 71b is integral with a front end part of the lower case 80, and the lid 71a is integral with a front end part of the upper case 70.

Figure 8:
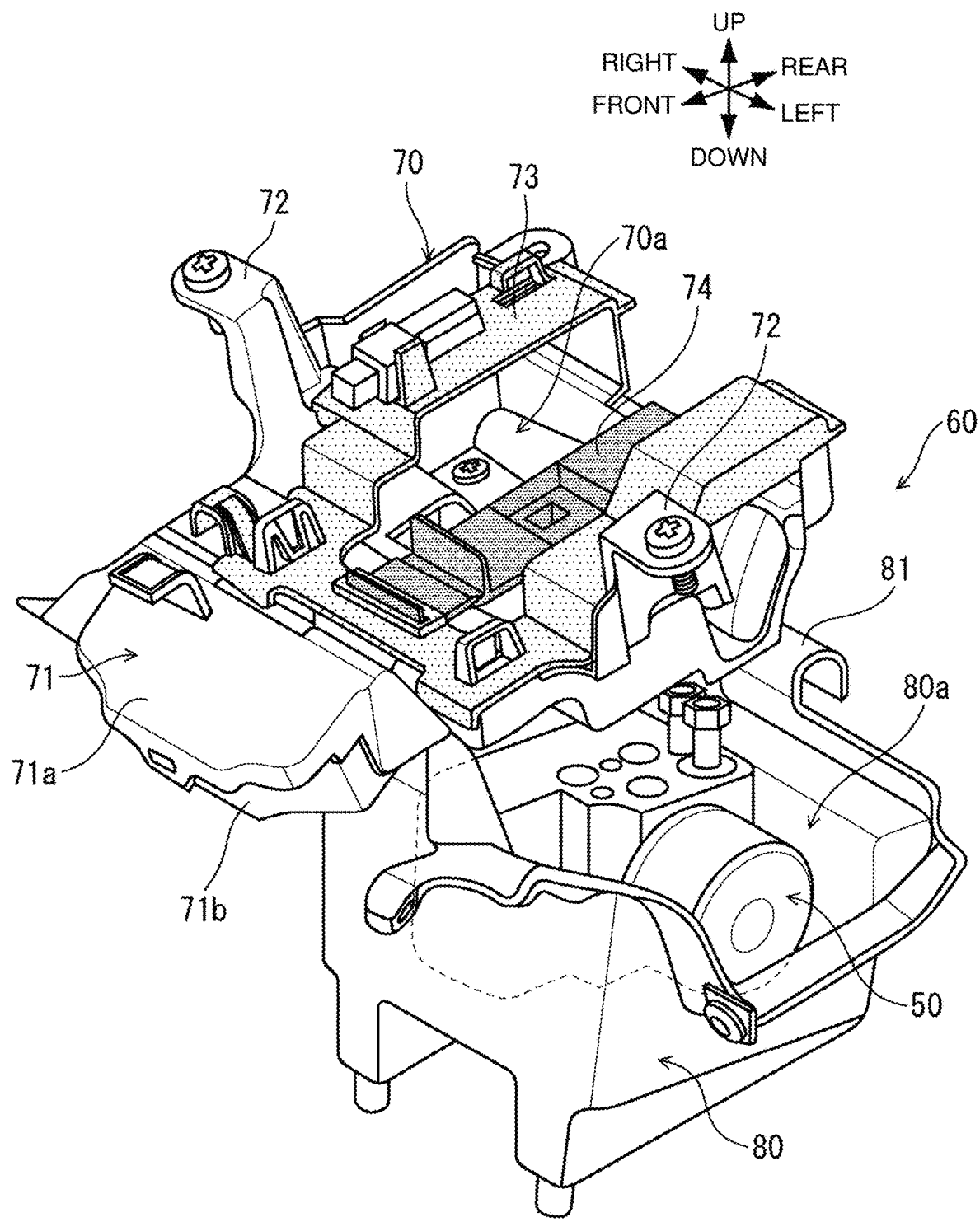
FIG. 8 is a perspective view of the case member without a first control device and a second control device viewed from the left front and above.
Figure 9:
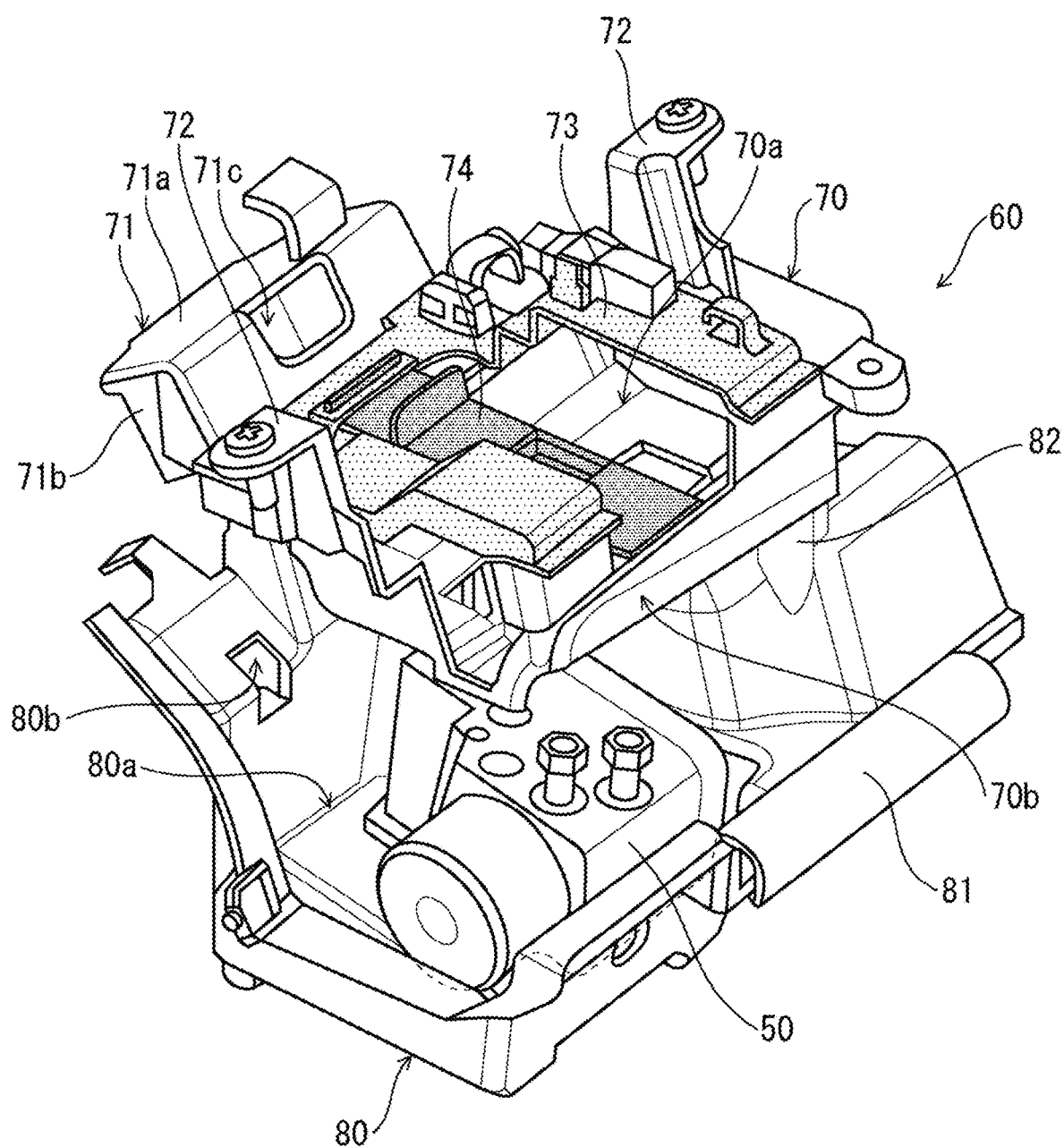
FIG. 9 is a perspective view of the case member viewed from the left rear and above.
Figure 10:
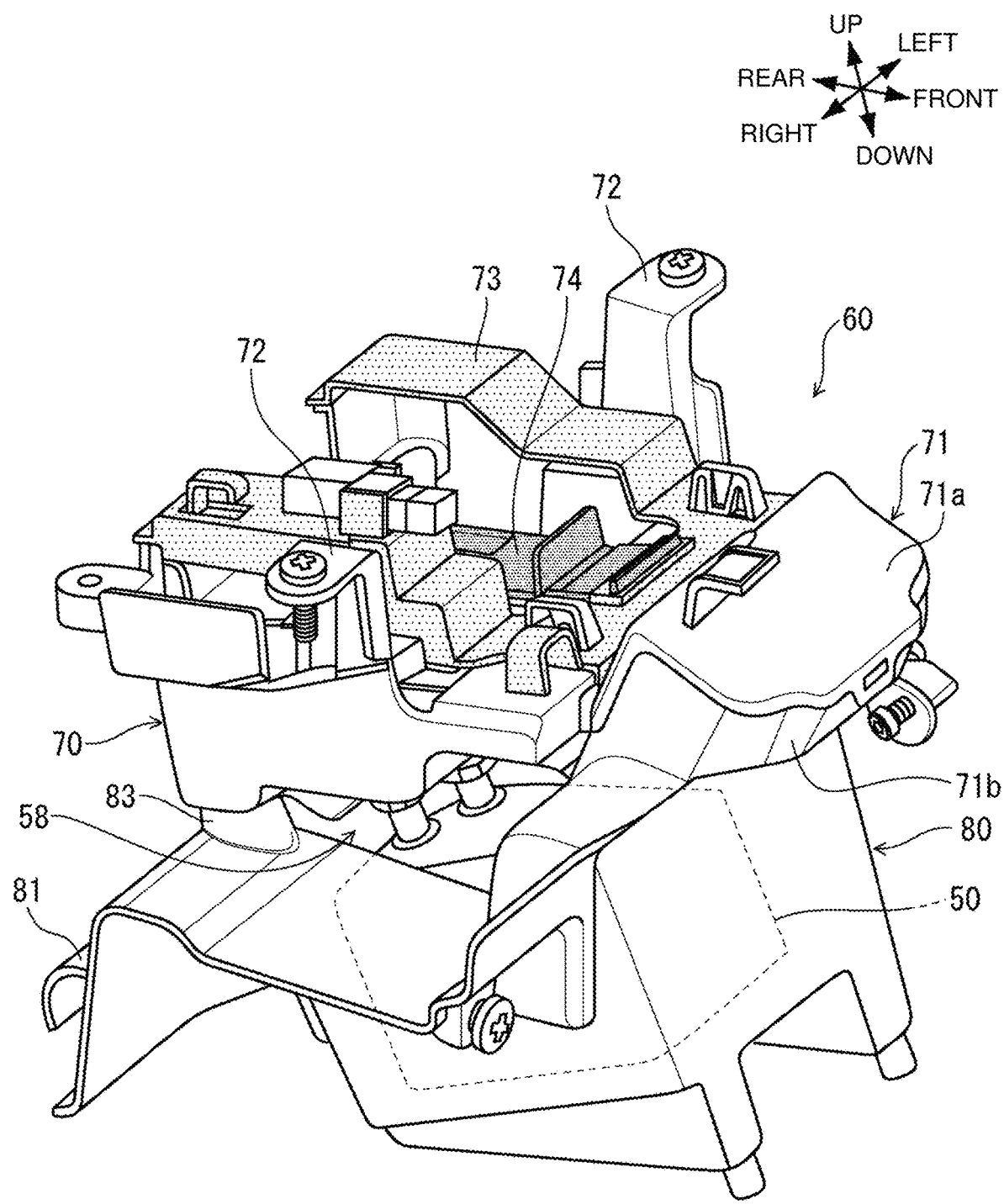
FIG. 10 is a perspective view of the case member viewed from the right front and above.

FIG. 8 is a perspective view of the case member 60 without the first control device 92 and the second control device 94 viewed from the left front and above of the vehicle body. FIG. 9 is a perspective view of the case member 60 viewed from the left rear and above of the vehicle body, and FIG. 10 is a perspective view of the case member 60 viewed from the right front and above of the vehicle body.

The lower case 80 includes an open-topped container to store the ABS modulator 50, and the container 71b of the sensor storage part 71 that is integral with the front end part of the container. The upper case 70 includes a container having a storage recess 70a to store the second control device 94, and the lid 71a of the sensor storage part 71 that is integral with the front end part of the container. Attaching the upper case 70 to the upper part of the lower case 80 closes the opening of the container 71b with the lid. Such a sensor storage part 71 with lid effectively protects the gyroscope sensor 90 from water, dust, heat from the power unit P, and the like.

A first lock plate 74 (hatching part with dense dots) and a second lock plate 73 (hatching part with sparse dots) are disposed at the rear end part of the upper case 70. These first lock plate 74 and second lock plate 73 are turnable around the rear end of the upper case 70. As shown in the drawing, these first lock plate 74 and second lock plate 73 have a function of turning (or being folded) forward so as to press the upper faces of the first control device 92 and the second control device 94.

Referring to FIG. 9, the lid 71a of the sensor storage part 71 has an opening 71c in the rear face, through which the connector 91 of the gyroscope sensor 90 passes. The storage part 80a to store the ABS modulator 50 is placed on the left of the lower case 80, and a left wall of the storage part is low to facilitate the connection of the duct to the ABS modulator 50 or the maintenance and to enhance the cooling effect of the ABS modulator 50. The cylindrical recess 70b at the rear face of the upper case 70 allows the cylindrical charcoal canister 51 to be positioned in proximity to the upper case 70, and so removes dead space to make the surroundings of the case member 60 compact.

Referring to FIG. 10, the lower case 80 has the storage part 80a for the ABS modulator 50 on the left in the vehicle width direction, and this keeps a space on the right to place the fixing member 82 (see FIG. 6) supporting the rear fender 42. The side opening 58 between the upper case 70 and the lower case 80 is defined between a support pillar 83 close to the rear end of the lower case 80 and on the right of the vehicle body and a standing part of the container 71b close to the front end.

Figure 11:
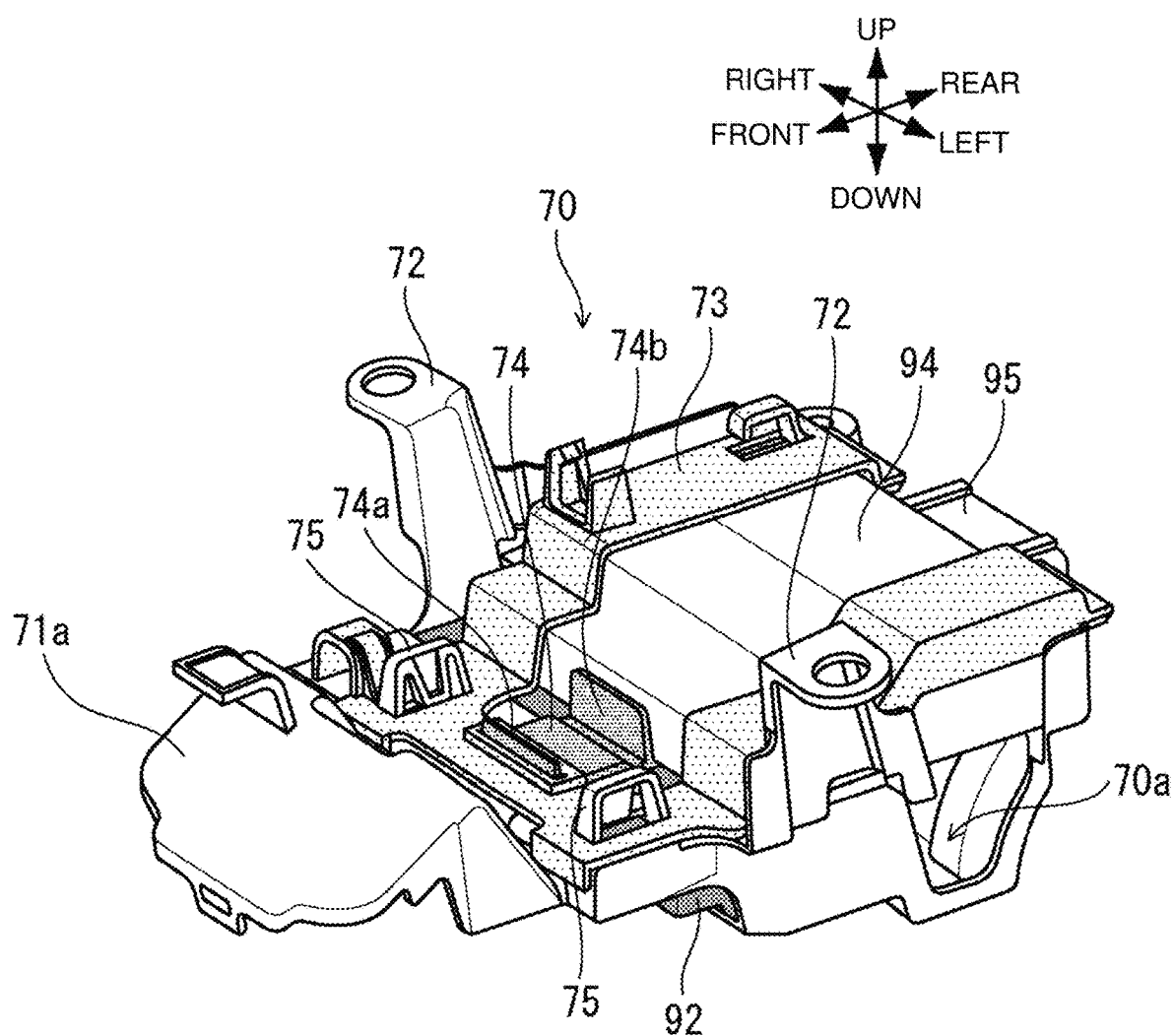
FIG. 11 is a perspective view of the upper case storing the first control device and the second control device viewed from the left front and above.

FIG. 11 is a perspective view of the upper case 70 storing the first control device 92 and the second control device 94 viewed from the left front and above of the vehicle body. The first control device 92 (gray part in the drawing) is stored at the bottom close to the front of the storage recess 70a of the upper case 70. The first lock plate 74 turning forward comes in contact with the upper face of the first control device 92, and the second control device 94 is disposed on the first lock plate 74. Then the second lock plate 73 having a step-like shape covers the upper face of the second control device 94. This keeps the first control device 92 and the second control device 94 in place. Such vertically proximally positioning of the first control device 92 and the second control device 94 reduces the height of the upper case 70, and so makes the case member 60 compact.

The first lock plate 74 has an engagement plate 74a engaging with an engagement slit in the second lock plate 73, and a positioning plate 74b to abut on the front end face of the second control device 94. Hook members 75 of the upper case 70 hold the front end of the second lock plate 73 on the upper face of the upper case 70.

Figure 12:
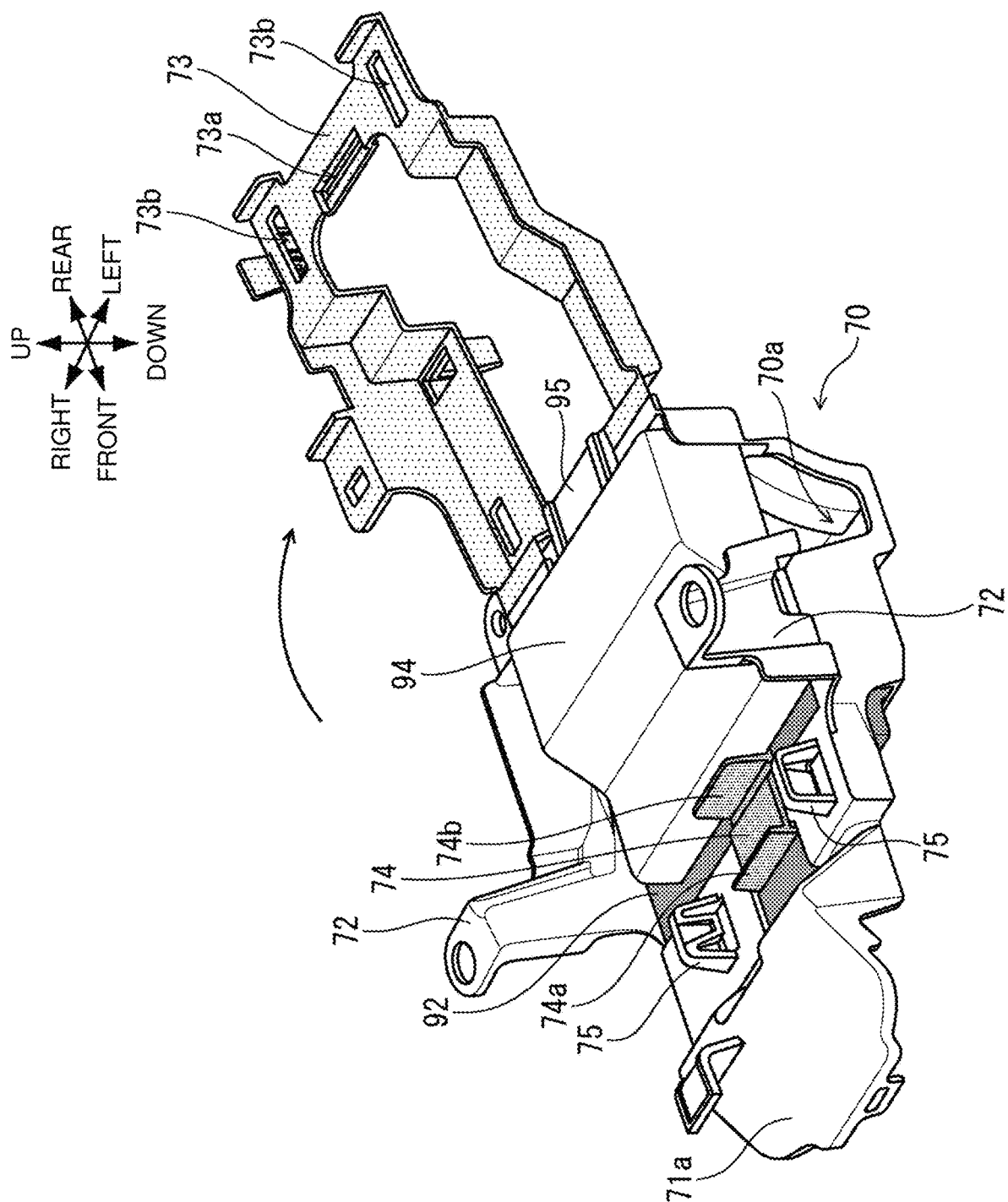
FIG. 12 is a perspective view of the upper case after the second lock plate in FIG. 11 is unfolded.

FIG. 12 is a perspective view of the upper case 70 after the second lock plate 73 of FIG. 11 is unfolded. The second lock plate 73 has a pair of left and right engagement holes 73b engaging with the hook members 75 of the upper case 70, and an engagement slit 73a located between these engagement holes 73b. Releasing of the engagement of the engagement holes 73b with the hook members 75 and the engagement of the positioning plate 74b with the engagement slit 73a and expanding (unfolding) the second lock plate 73 rearward makes the second control device 94 removable.

Figure 13:
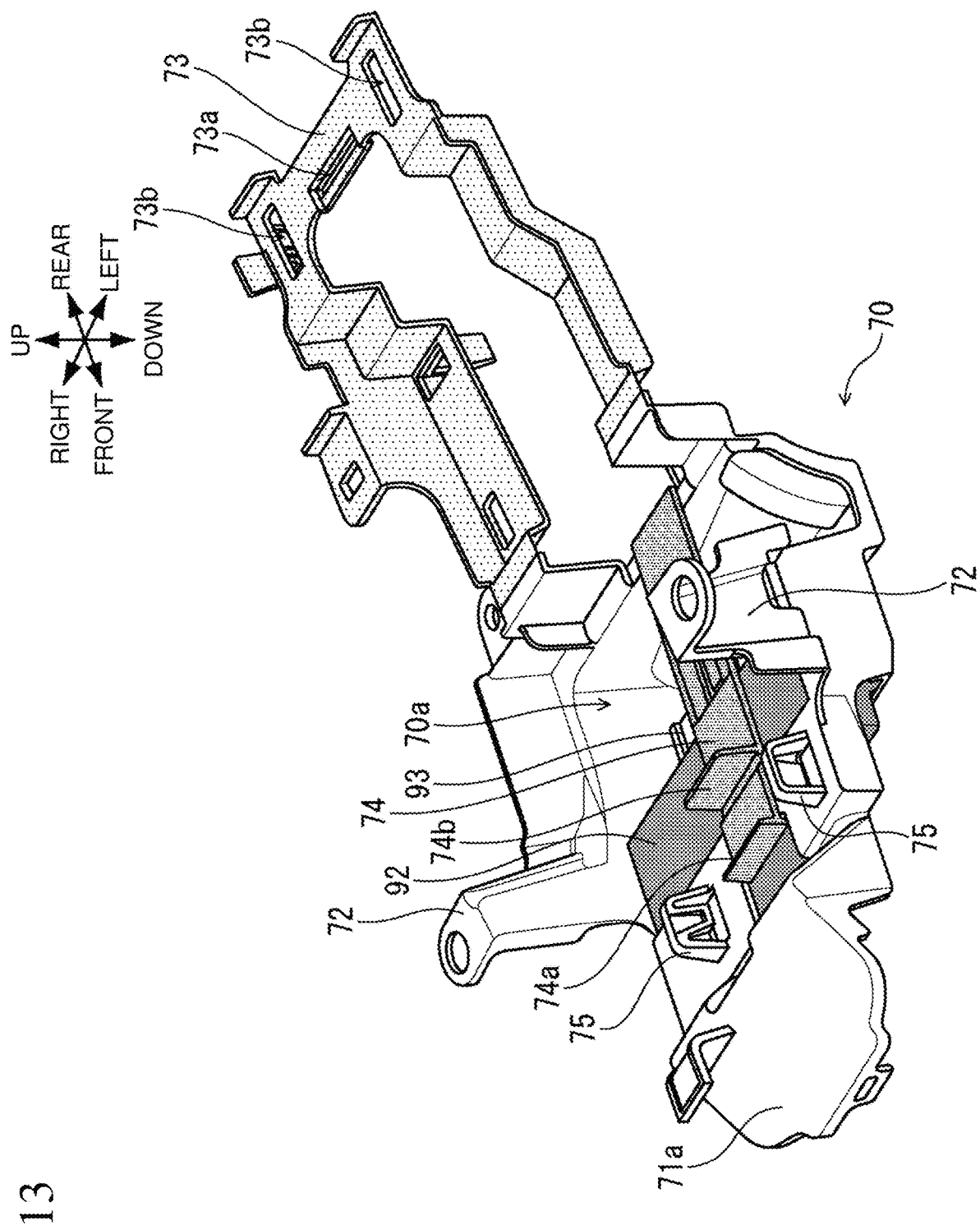
FIG. 13 is a perspective view of the upper case after the second control device in FIG. 12 is removed.
Figure 14:
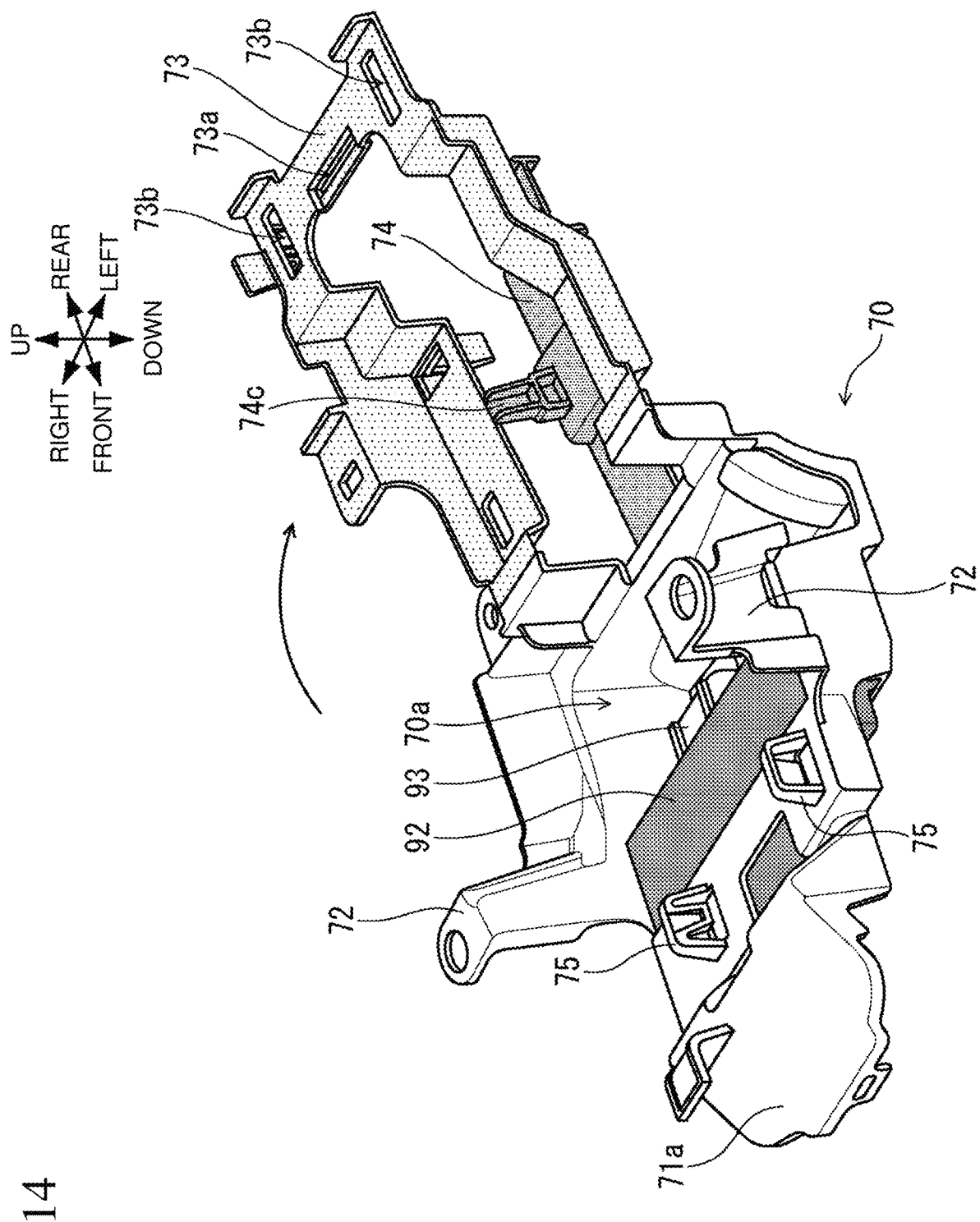
FIG. 14 is a perspective view of the upper case after the first lock plate in FIG. 13 is unfolded.

FIG. 13 is a perspective view of the upper case 70 after the second control device 94 of FIG. 12 is removed. FIG. 14 is a perspective view of the upper case 70 after the first lock plate 74 of FIG. 13 is unfolded. The first lock plate 74 at the center of the upper case 70 is narrow, and has a shape fitting in the second lock plate 73 having a substantially U-letter shape. The first lock plate 74 has a downward protrusion 74c that abuts on the rear end face of the first control device 92 when the first lock plate 74 is folded forward and so has a positioning function of the first control device 92. Unfolding of this first lock plate 74 rearward makes the first control device 92 removable.

As described above, the upper case 70 is integral with the first lock plate 74 and the second lock plate 73 that are turnable around the rear end of the upper case 70. The first lock plate 74 is folded (turns) forward of the vehicle body so as to press the upper face of the first control device 92 stored in the storage recess 70a. The second control device 94 is positioned above and adjacent to the first control device 92 while having the first lock plate 74 between these control devices, and the second lock plate 73 is folded (turns) forward of the vehicle body so as to press the upper face of the second control device 94. The forward ends of the first lock plate 74 and the second lock plate 73 engage with the upper face of the upper case 70. These first lock plate 74 and second lock plate 73 stably hold the first control device 92 and the second control device 94. The first lock plate 74 sandwiched between the first control device 92 and the second control device 94 keeps the minimum distance between these control devices while isolating the control devices from vibrations and enabling the heat dissipation. These first lock plate 74 and second lock plate 73 are integral with the upper case 70, and this reduces the number of components of the upper case 70.

Various modifications are possible to the above embodiment, including the form of the motorcycle, the shapes and the types of the first control device and the second control device, the shape and the structure of the ABS modulator, the shape and the structure of the case member, the shapes and the structures of the upper case and the lower case, the shapes and the structures of the sensor storage part and the lock plates, and the joining structure of the upper case and the lower case. The sensor stored in the sensor storage part is not limited to a gyroscope sensor, which may be an acceleration sensor or a tilt sensor. The electrical component stored in the lower case is not limited to the ABS modulator, which may be an ECU or a traction control unit, for example. The electrical component mounting structure of the present invention is applicable to vehicles other than motorcycles, such as a three-wheeled or four-wheeled saddled vehicle.

REFERENCE SIGNS LIST

1 . . . Saddled vehicle, 2 . . . Fuel tank, 24 . . . Swing arm, 33 . . . Seat, 34 . . . Rear cushion, 42 . . . Rear fender, 50 . . . ABS modulator (drive unit), 51 . . . Canister, 53 . . . Regulator, 58 . . . Side opening, 60 . . . Case member, 70 . . . Upper case, 70a . . . Storage recess, 70b . . . Cylindrical recess, 71 . . . Sensor storage part, 71b . . . Container, 71a . . . Lid, 73 . . . Second lock plate, 74 . . . First lock plate, 80 . . . Lower case, 90 . . . Sensor, 92 . . . First control device (control device), 94 . . . Second control device (control device), P . . . Power unit, F . . . Vehicle body frame, WR . . . Rear wheel

What is claimed is:

1. An electrical component mounting structure for a saddled vehicle including a vehicle body frame supporting a power unit of the saddled vehicle, a rear wheel that rotates by a driving force from the power unit, a seat, on which a rider sits, and a control device configured to control the vehicle, the electrical component mounting structure being configured to place the control device at a position surrounded with the vehicle body frame, the rear wheel, and the seat, the electrical component mounting structure comprising:
  a case member to place the control device, the case member including
    a lower case storing a drive unit, and
    an upper case joining to the lower case and covering the lower case from the above, the case member having a sensor storage part at a front end, the sensor storage part storing a sensor; and
the control device attached to the upper case, wherein
the sensor storage part includes a container storing the sensor and a lid that covers the container from the above,
the lid is located at a front end of the upper case, and
the container is located at a front end of the lower case.

2. The electrical component mounting structure for saddled vehicle according to claim 1, wherein a rear cushion is disposed forward and downward of the sensor storage part, and
the rear cushion absorbs vibrations of a swing arm that rotatably supports the rear wheel.

3. The electrical component mounting structure for saddled vehicle according to claim 2, wherein a fuel tank is disposed above the sensor storage part.

4. The electrical component mounting structure for saddled vehicle according to claim 2, wherein attachment of the upper case and the lower case define a side opening between the upper case and the lower case.

5. The electrical component mounting structure for saddled vehicle according to claim 2, wherein the control device includes
a first control device stored in a storage recess of the upper case, and
a second control device that is positioned above and adjacent to the first control device.

6. The electrical component mounting structure for saddled vehicle according to claim 1, wherein a fuel tank is disposed above the sensor storage part.

7. The electrical component mounting structure for saddled vehicle according to claim 6, wherein attachment of the upper case and the lower case define a side opening between the upper case and the lower case.

8. The electrical component mounting structure for saddled vehicle according to claim 6, wherein the control device includes
a first control device stored in a storage recess of the upper case, and
a second control device that is positioned above and adjacent to the first control device.

9. The electrical component mounting structure for saddled vehicle according to claim 1, wherein attachment of the upper case and the lower case define a side opening between the upper case and the lower case.

10. The electrical component mounting structure for saddled vehicle according to claim 1, wherein the control device includes
a first control device stored in a storage recess of the upper case, and
a second control device that is positioned above and adjacent to the first control device.

11. The electrical component mounting structure for saddled vehicle according to claim 10, wherein the upper case is integral with a first lock plate and a second lock plate that are positioned at a rear end of the upper case, the first lock plate and the second lock plate being turnable around the rear end of the upper case,
the first lock plate turns forward to press an upper face of the first control device stored in the storage recess,
the second control device is positioned above and adjacent to the first control device having the first lock plate between the first and second control devices,
the second lock plate turns forward to press an upper face of the second control device, and
the first lock plate and the second lock plate have forward ends that engage with an upper face of the upper case.

12. The electrical component mounting structure for saddled vehicle according to claim 1, wherein the case member has a bottom face, and a regulator is attached to the bottom face.

13. The electrical component mounting structure for saddled vehicle according to claim 1, wherein the case member has, at its rear end, a cylindrical recess to position a cylindrical canister in proximity to the case member.

14. The electrical component mounting structure for saddled vehicle according to claim 1, wherein a rear fender is attached to a lower part of the rear end of the case member, and the rear fender covers the rear wheel from the front and the above.

* * * * *